(12) United States Patent
Catelli et al.

(10) Patent No.: US 12,441,046 B2
(45) Date of Patent: Oct. 14, 2025

(54) METHOD AND SYSTEM FOR PRODUCING PLASTIC CONTAINERS

(71) Applicant: SIAPI S.R.L., San Vendemiano (IT)

(72) Inventors: Roberto Catelli, Parma (IT); Marco Sgorlon, San Dona' di Piave (IT); Manuel Rosada, Vittorio Veneto (IT); Stefano Tonti, Parma (IT)

(73) Assignee: SIAPI S.R.L., San Vendemiano (IT)

( * ) Notice: Subject to any disclaimer, the term of this patent is extended or adjusted under 35 U.S.C. 154(b) by 154 days.

(21) Appl. No.: 17/905,895

(22) PCT Filed: Mar. 10, 2021

(86) PCT No.: PCT/IB2021/051989
§ 371 (c)(1),
(2) Date: Sep. 8, 2022

(87) PCT Pub. No.: WO2021/181299
PCT Pub. Date: Sep. 16, 2021

(65) Prior Publication Data
US 2023/0118628 A1    Apr. 20, 2023

(30) Foreign Application Priority Data
Mar. 12, 2020  (IT) ...................... 102020000005350

(51) Int. Cl.
*B29C 49/12*  (2006.01)
*B29C 49/42*  (2006.01)
(Continued)

(52) U.S. Cl.
CPC ........ *B29C 49/42073* (2022.05); *B29C 49/12* (2013.01); *B29C 49/42065* (2022.05);
(Continued)

(58) Field of Classification Search
CPC .... B29C 2049/5837; B29C 2049/5841; B29C 49/6418; B29C 49/42065; B29C 49/28012
See application file for complete search history.

(56) References Cited

U.S. PATENT DOCUMENTS 4,106,886 A * 8/1978 Sokolow ........... B29C 49/42122
425/534
4,560,340 A   12/1985 Younkin et al.
(Continued)

FOREIGN PATENT DOCUMENTS

DE   102004046982 A1   4/2006
EP       3173211 A1   5/2017
(Continued)

*Primary Examiner* — Jacob T Minskey
*Assistant Examiner* — Debjani Roy
(74) *Attorney, Agent, or Firm* — Chrisman Gallo Tochtrop LLC

(57) ABSTRACT

A system for producing plastic containers from preforms, comprising: a plurality of blowing stations comprising at least a first and a second blowing station (31, 32) for blowing the preforms; a movement system (2) for moving the preforms comprising a delivery line (21) for delivering the preforms towards said blowing stations. The delivery line (21) comprises a first and a second outlet zone (211, 212) of the preforms from said delivery line (21). The first and the second outlet zone (211, 212) for the outlet of the preforms are in mutually distinct positions and are intended to supply the first blowing station (31) and the second blowing station (32), respectively.

9 Claims, 13 Drawing Sheets

(51) Int. Cl.
  *B29C 49/64* (2006.01)
  *B29K 67/00* (2006.01)
  *B29L 31/00* (2006.01)

(52) U.S. Cl.
  CPC .... *B29C 49/42101* (2022.05); *B29C 49/6418* (2013.01); *B29K 2067/003* (2013.01); *B29L 2031/7158* (2013.01)

(56) References Cited

U.S. PATENT DOCUMENTS

| | | | |
|---|---|---|---|
| 4,624,821 A | | 11/1986 | Younkin et al. |
| 5,910,326 A | * | 6/1999 | Oas ..................... B29C 49/4205 198/740 |
| 9,283,709 B2 | | 3/2016 | Lindner et al. |
| 10,322,540 B2 | | 6/2019 | Okuyama et al. |
| 10,363,697 B2 | | 7/2019 | Lahogue et al. |
| 11,518,077 B2 | | 12/2022 | Niewels et al. |
| 2017/0210052 A1 | | 7/2017 | Okuyama et al. |
| 2020/0262129 A1 | * | 8/2020 | Linke ..................... B29C 49/36 |
| 2022/0040900 A1 | * | 2/2022 | Hidaka ............... B29C 49/4205 |

FOREIGN PATENT DOCUMENTS

| | | | |
|---|---|---|---|
| EP | 2848382 B1 | | 12/2017 |
| FR | 3035651 A1 | | 11/2016 |
| JP | 2021127129 | * | 9/2021 |
| WO | 2020/041889 A1 | | 3/2020 |

\* cited by examiner

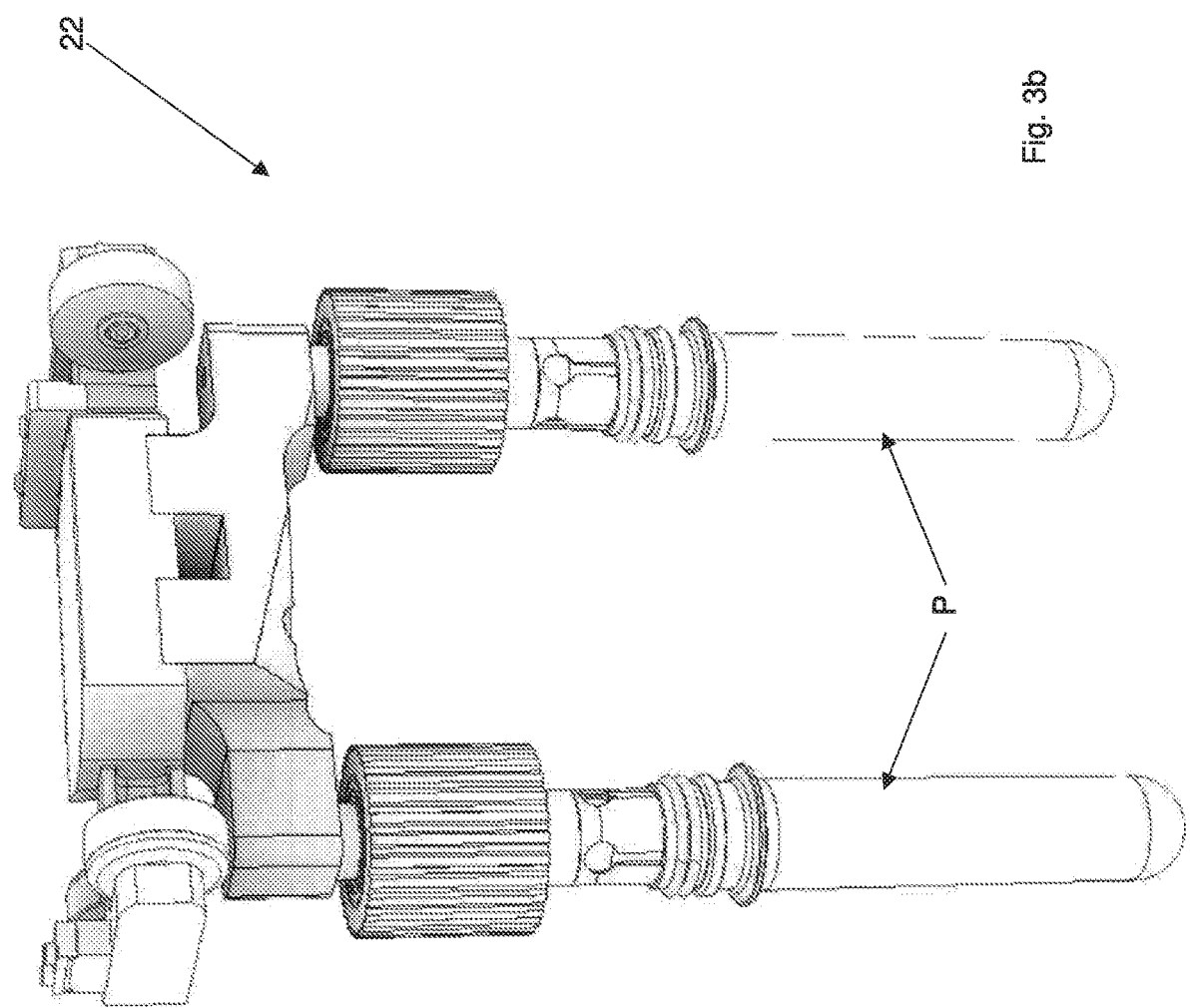

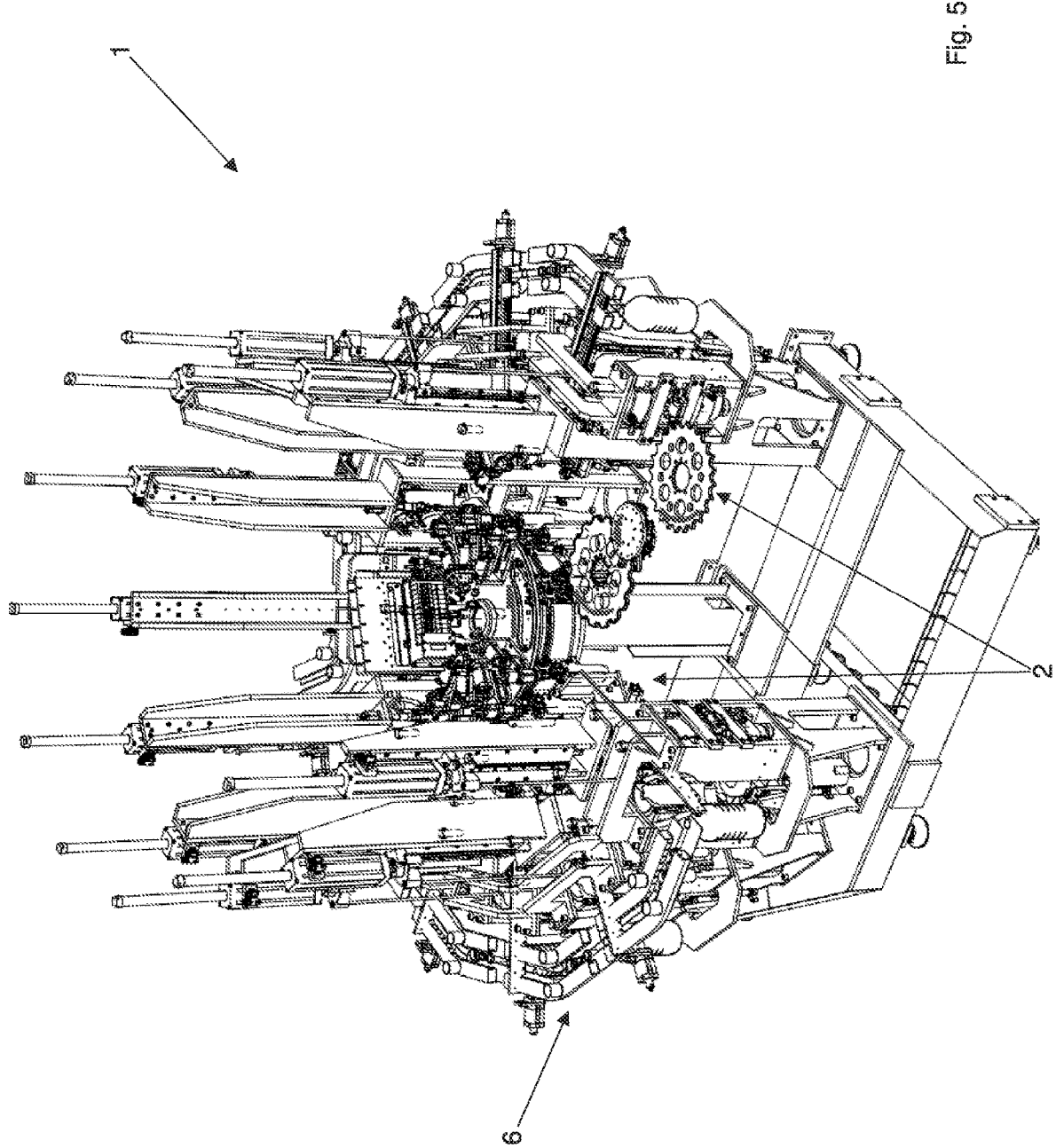

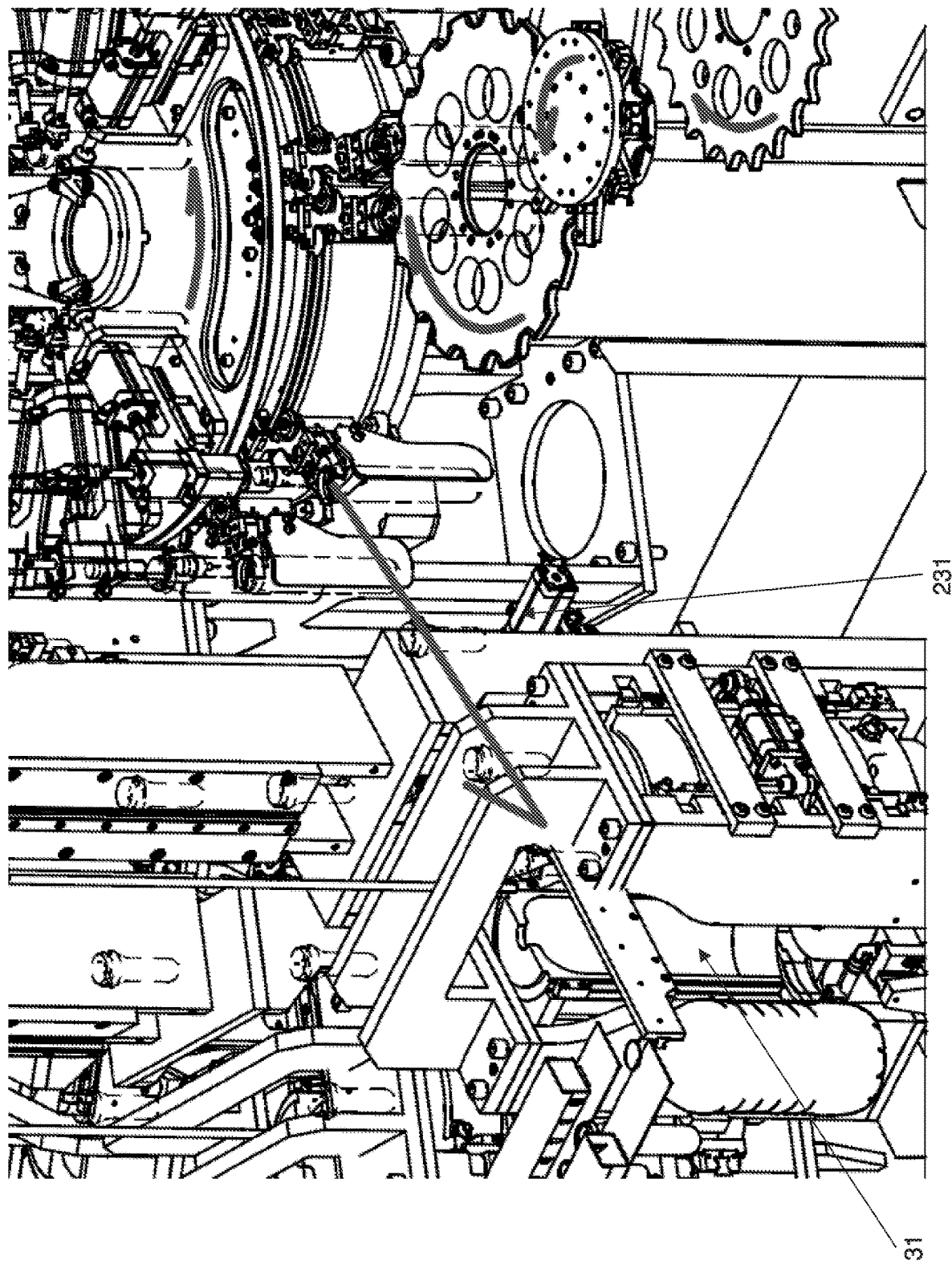

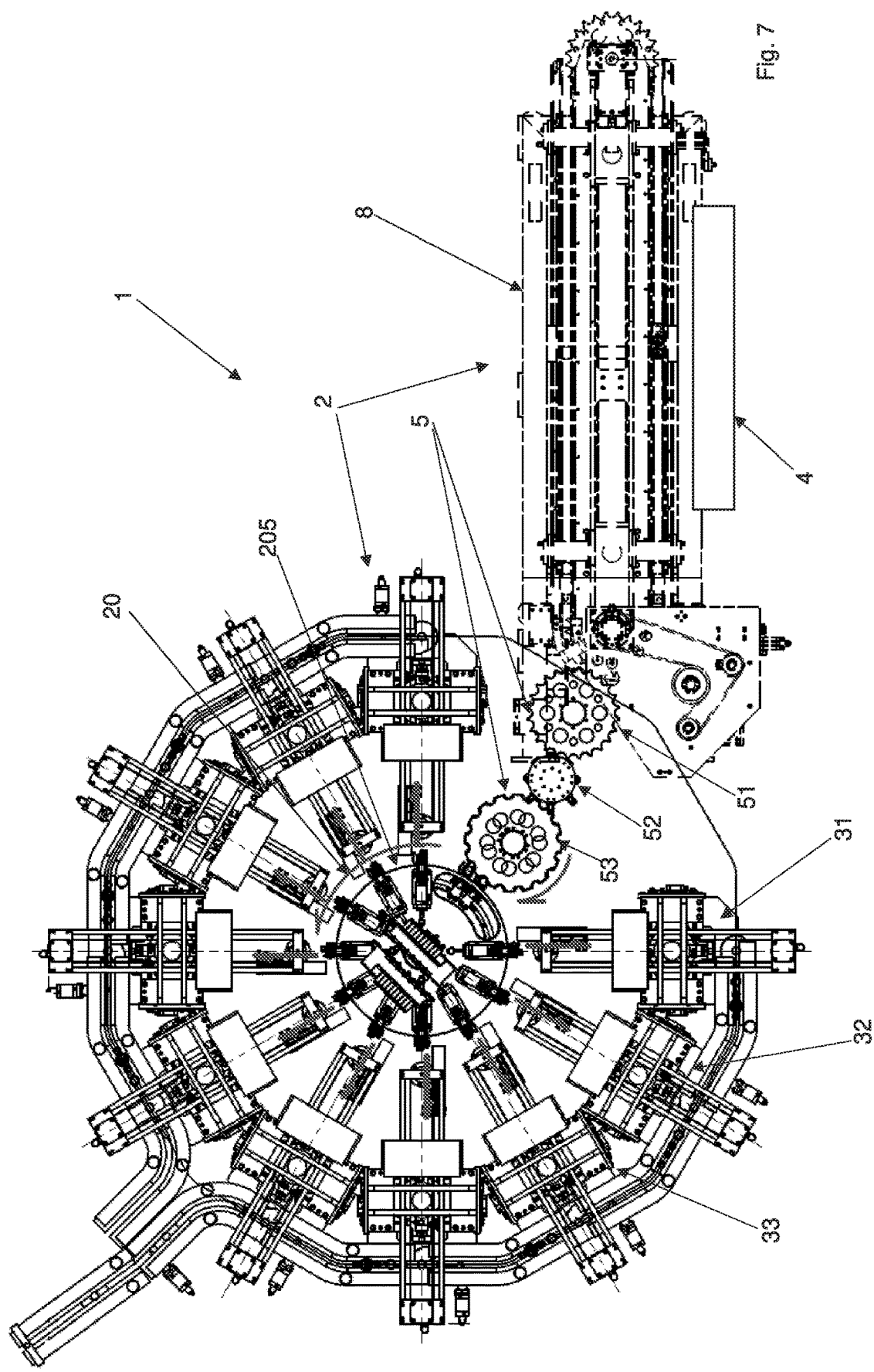

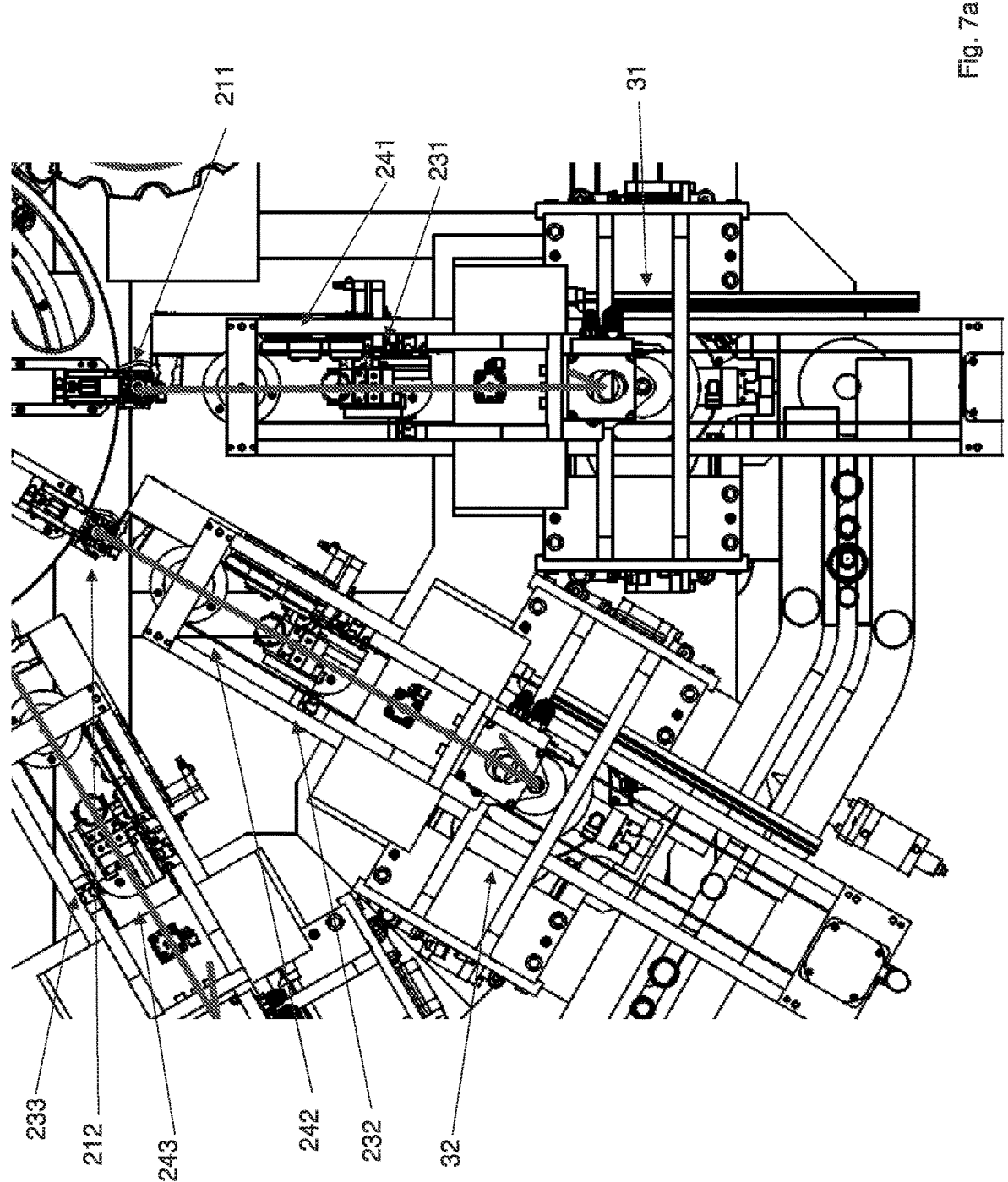

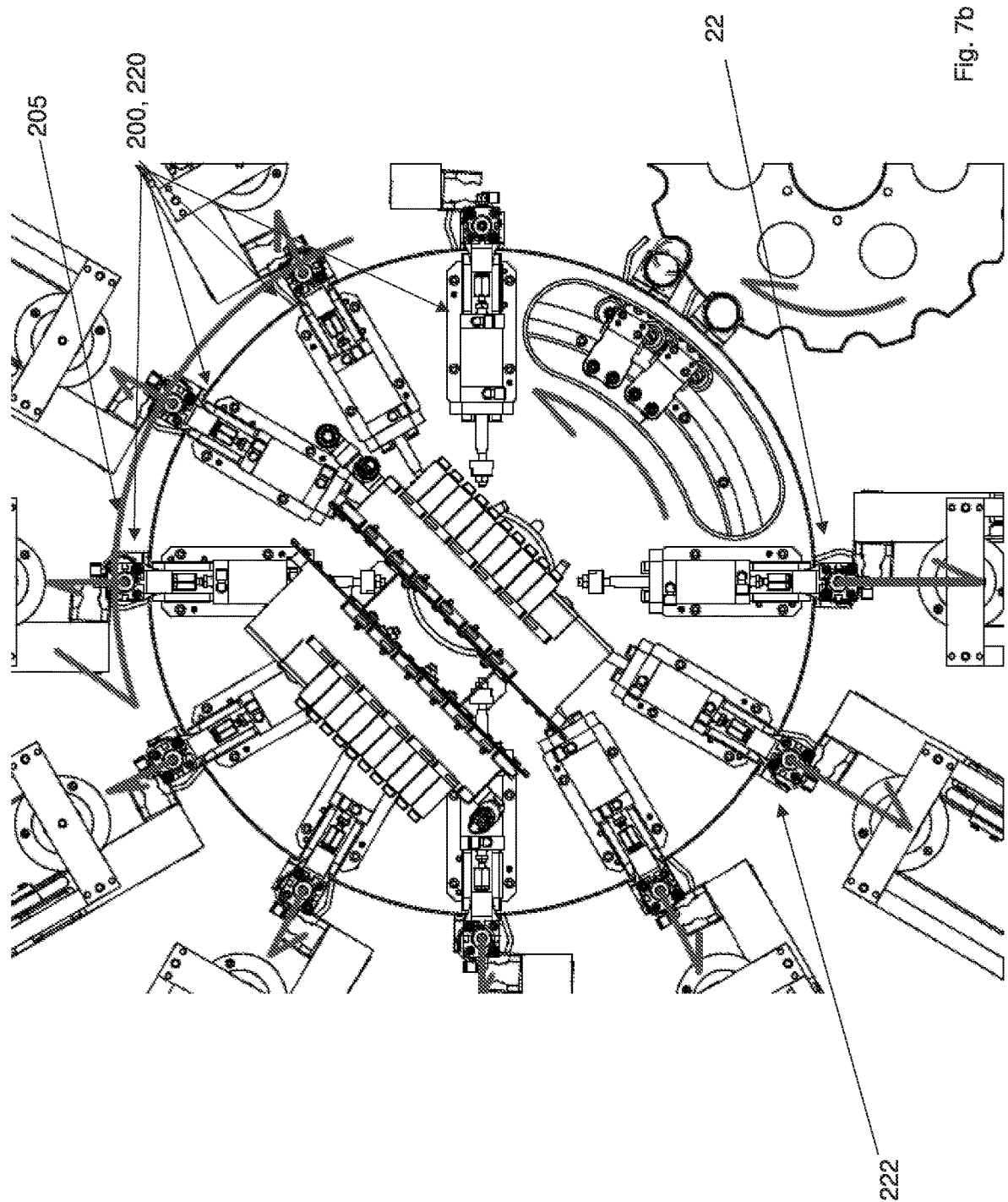

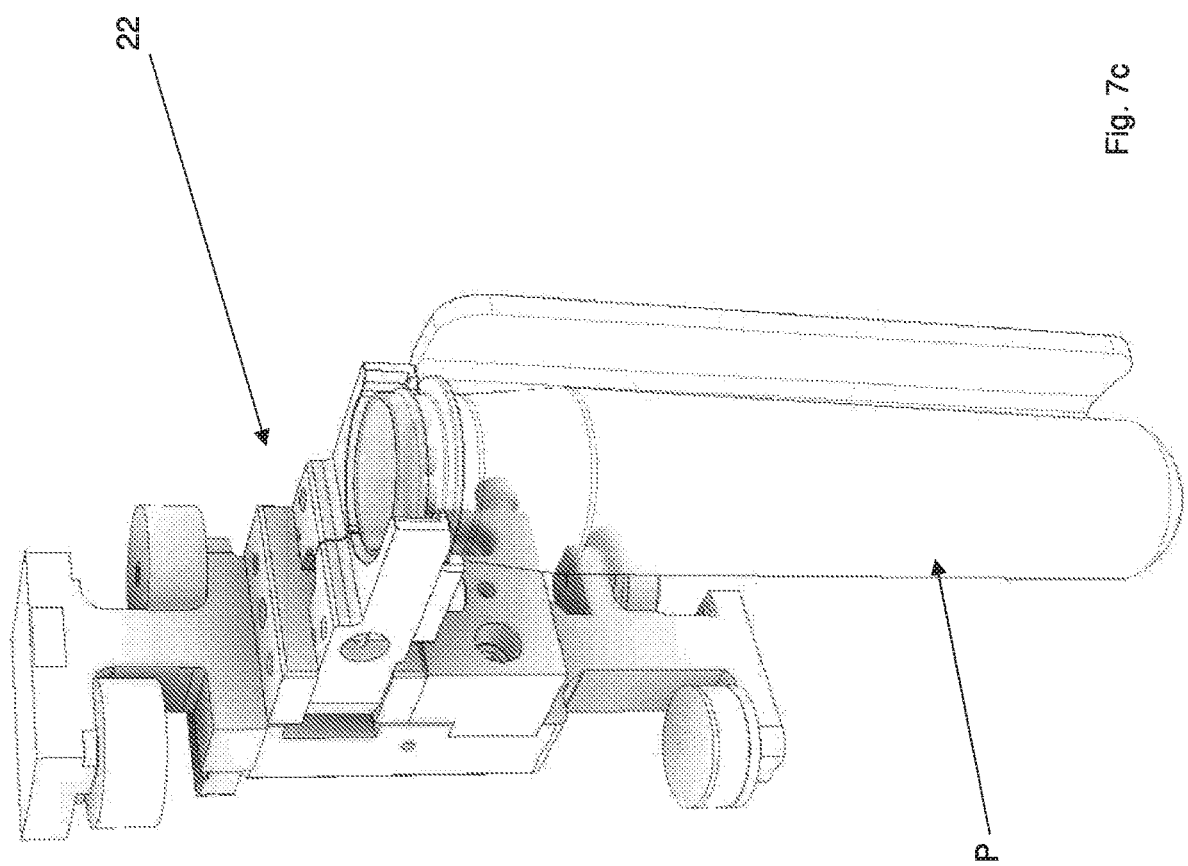

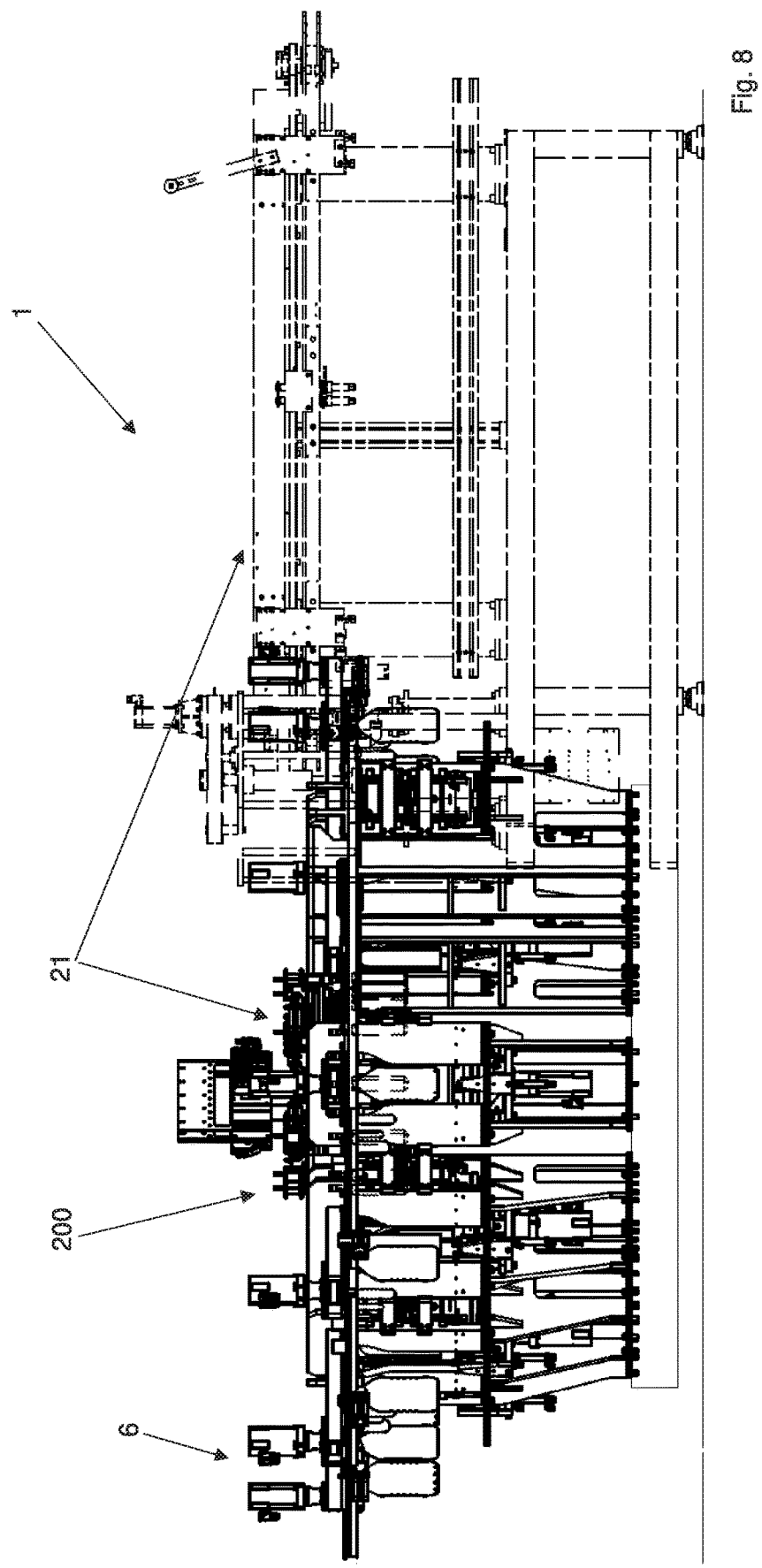

METHOD AND SYSTEM FOR PRODUCING PLASTIC CONTAINERS

TECHNICAL FIELD

The present invention relates to a method and system for producing plastic containers from preforms.

BACKGROUND ART

Two-stage blowing machines for producing plastic (PET) bottles are known, starting from a hollow semi-processed product known as a preform.

By exploiting the thermoplastic characteristics of the polymer of which it is composed, the preform is subjected to a heating process, using ovens, and subsequently modelled in a mould thus obtaining the container of the desired shape and capacity. Going into detail, inside the mould, the preform is mechanically stretched, using a rod, and simultaneously subjected to a high pressure air flow. Adhering to the walls of the mould the material assumes the shape, in fact obtaining the container.

There are two families of two-stage blowers. The first is known as a rotary blower and the second as a linear one.

Although in both cases the preforms undergo the same stretching and blowing process, the two are mainly distinguished by the technical solution regarding the handling of the preforms and the sequence with which they are processed.

In both solutions there are loading, heating, handling, blowing and unloading stations for the preforms. The loading and heating are substantially the same for both solutions; the preform is loaded onto a spindle chain and, crossing a series of infra-red ray ovens, it is brought to a suitable temperature for blowing. The conditioned preform is transferred to the mould in which the bottle is formed. The management of the transfer and the management of the mould is instead different in the case of a rotary or linear blower.

In the rotary blower each preform is positioned in a single mould through a first rotating arm transferor which, with a synchronous frequency, takes it off the heating chain.

Therefore, there is a rotary circular carousel comprising along its perimeter a plurality of moulds for blowing the preforms.

The first transferor needs to be synchronised with the carousel so that, upon the arrival of every preform, an empty mould is in position to accept it. In the same way a second rotating arm transferor, appropriately positioned and synchronised with the carousel and the moulds, takes the bottles from the mould releasing them into the unloading device.

A drawback of such solution is connected with the fact that the blowing time inside the mould is restricted to the rotation speed of the carousel and therefore indirectly restricts the hourly production. A further drawback is connected with the cost of constructing such a rotary machine.

The linear blower consists of a preform loading and heating device very similar to that of rotary blowers. There is only one mould which occupies a predefined position of the machine (it is therefore not on board a carousel or other movement system). The mould simultaneously processes various preforms. In other words, the transfer system picks up various preforms simultaneously by the heating system and transfers them into the mould according to a linear movement.

The containers, previously blown in the mould, are transferred onto the relevant unloading device.

A drawback of such solution is connected with the fact that various preforms are transferred into the mould together. Therefore, the transfer takes place when a sufficient number of preforms is available for transfer. A drawback of such solution is connected with the fact that the movement is slower with respect to the continuous movement of the rotary blowers. Therefore linear blowers have a lower hourly productivity with respect to rotary blowers. Furthermore, in linear blowers the time that passes between the heating of the preform and blowing is not exactly uniform for all preforms (an aspect that would be desirable for the purpose of the quality of the process and uniform production). In fact, the preforms are introduced into the blowing mould in blocks and after being heated some preforms wait for there to be a sufficient number of preforms to be transferred in a block.

In summary, it can be stated that the rotary solution guarantees a better result/product; in fact, for every individual preform it keeps constant the time that passes between the exit from the ovens to blowing.

Instead, in the linear solution, the preforms exit in sequence from the ovens and are transferred into the press in groups and then blown at the same time; between the first and the last preform, in the linear transfer path as far as the mould, almost one cycle time passes; therefore, the quality of the containers of a same sequence can vary.

Due to the very nature of its design, in a linear machine, to make the bottles exit from the mould and simultaneously let the preforms in, it is necessary to travel along a relatively long space, with respect to the rotary solution where the space to travel along is that of only one mould and therefore constant for every individual preform.

The final result is that the specific productivity of a linear machine will tend to be lower than that of a rotary machine.

From the point of view of the mechanical characteristics, the rotary machine has a much higher degree of complexity in that the mould system is to be placed in rotation as is the blowing air supply system, the cooling water system and the implementation of the electrical connections; it follows that the basic cost of the rotary system is higher, just as the related maintenance is more expensive and complex.

DISCLOSURE OF THE INVENTION

In this context, the technical task underpinning the present invention is to propose a method and a system for producing plastic containers from preforms that enables maximum process flexibility and at the same time enables the moving masses to be minimised, in particular rotating masses.

The stated technical task and specified objects are substantially achieved by a method and a system for producing plastic containers from preforms, comprising the technical features disclosed in one or more of the appended claims.

BRIEF DESCRIPTION OF THE DRAWINGS

Further characteristics and advantages of the present invention will become more apparent from the approximate and thus non-limiting description of a preferred, but not exclusive, embodiment of a method and a system for producing plastic containers from preforms, as illustrated in the accompanying drawings, in which:

FIG. 3b shows a detail of the solution of FIGS. 1, 2, 3, 4;

FIG. 5 is a perspective view of a second design solution according to the present invention;

FIG. 6 shows a detail of the solution of FIG. 5;

FIGS. 7 and 8 show, respectively, a plan view and a lateral view, of the second design solution according to the present invention;

FIGS. 7a and 7b show enlargements of portions of FIG. 7;

FIG. 7c shows a detail of the solution of FIGS. 5, 6, 7, 8.

DETAILED DESCRIPTION OF PREFERRED EMBODIMENTS OF THE INVENTION

Figure 1:
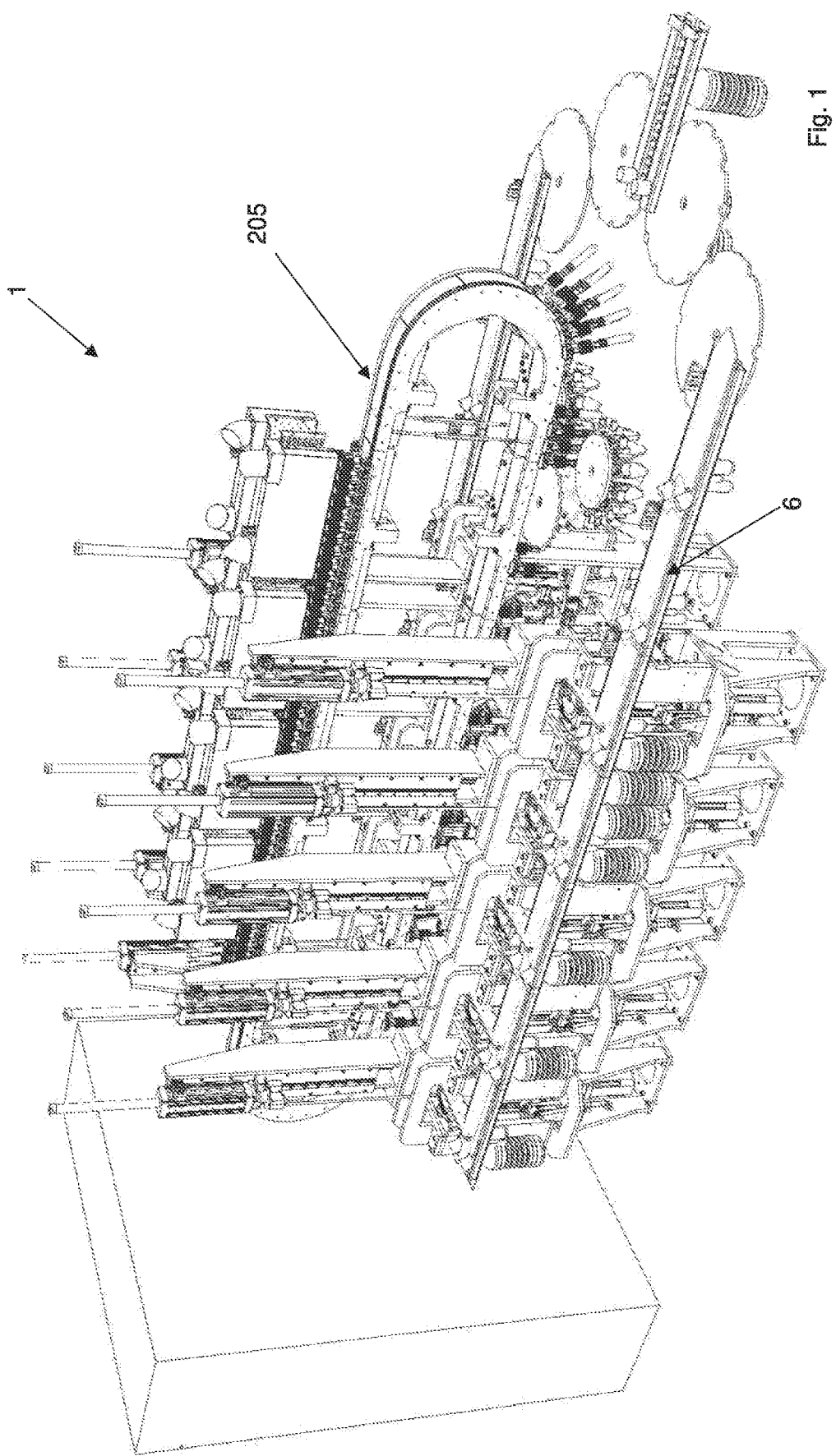
FIG. 1 is a perspective view of a first design solution according to the present invention.

In the accompanying drawings, reference number 1 indicates a system for producing plastic containers from preforms.

Such system 1 comprises a movement system 2 for moving the preforms.

Such movement system 2 for moving the preforms comprises a delivery line 21 for delivering the preforms.

The system 1 appropriately comprises a loading system for loading the preforms along the delivery line 21.

The system 1 appropriately comprises a heating means 4 for heating the preforms. The heating means 4 for heating the preforms is located along the delivery line 21. Appropriately, the means 4 exercises its action at least simultaneously to the displacement of the preforms along the delivery line 21. The heating means 4 for heating the preforms is located downstream of the loading station. Typically, but not necessarily, the heating means 4 for heating the preforms exercises its action by radiation, typically they may be infra-red rays. Advantageously, the heating means 4 can therefore comprise infra-red lamps. In technical language, the heating means 4 is also called a heating oven. Advantageously, there is a battery of ovens in series along the delivery line 21.

In a particular embodiment, at the heating means 4, the preforms are arranged (and appropriately moved) in two parallel rows. Appropriately the parallel rows can be located at a fixed or variable mutual distance. The preforms move with an optimised pitch automatically in relation to the dimensions of the preform.

The heating means 4 comprises two external walls (preferably parallel to one another). The two external walls are preferably cooled. Appropriately, the two external walls are made of infra-red reflecting material. The heating means 4 appropriately comprises a plurality of heating ovens that define modular elements in succession. In some cases in at least one of such ovens the two external walls may comprise or be substituted by infra-red lamps.

Preferably there is a radiating part (which typically comprises the infra-red lamps) which is advantageously placed in the middle of the oven. Appropriately, the heating means 4 (in particular the infra-red lamps) are at least partially placed between the two rows of preforms (appropriately in the middle); in this way, the heating means 4 placed between the two rows (appropriately each individual lamp placed between the two rows) irradiates both rows of preforms. Appropriately, the heating of the two rows of preforms takes place simultaneously. Advantageously, the lamps are positioned on a rack with a fixed and/or variable vertical pitch.

In the preferred solution the lamps can have reflecting screens or not. In particular, in the central row, the lamps can have a double screening according to a vertical plane. This enables the heating influences of a certain zone by the lamps not arranged in that particular zone to be reduced.

Advantageously, the heating means/heating ovens 4 are provided with a ventilation and/or suction system.

The system 1 comprises a plurality of blowing stations comprising in particular a first and a second blowing station 31, 32 for blowing the preforms. The preforms are supplied by said movement system 2 to the first and the second station 31, 32.

The delivery line 21 comprises a plurality of preform outlet zones for directing them towards corresponding blowing stations; in particular, the first line 21 comprises a first and a second outlet zone 211, 212 for the outlet of the preforms from said delivery line 21.

The first and the second outlet zone 211, 212 for the outlet of the preforms are in distinct positions and are intended to supply the first blowing station 31 and the second blowing station 32, respectively. The first and the second outlet zone 211, 212 for the outlet of the preforms (advantageously like all the others) are located in a fixed position along the delivery line 21. The system 1 further comprises a third blowing station 33 for blowing the preforms supplied by said movement system 2.

Throughout this text the ordinal adjectives first, second and third have been used to distinguish between blowing stations or outlet zones, etc.; in no case are they meant to indicate temporal character.

The delivery line 21 comprises a third outlet zone 213 distinct from said first and second outlet zone 211, 212 for supplying said third blowing station 33. Also the third outlet zone 213 is in a fixed position.

Appropriately, the first station 31, the second station 32 and any third station 33 are connected in parallel to one another (therefore they are interposed between a common container supply and a common container collection zone). Appropriately, the first station 31, the second station 32 and any third station 33 operate in sequence, or simultaneously to one another. More generally, the above can be repeated for all the blowing stations present in the system 1.

Appropriately, the system 1 comprises various blowing stations. In a particular embodiment, there are less than fourteen of them, even if embodiments can be provided with a higher number of blowing stations.

Appropriately, in the first blowing station 31, a pressure difference between the inside and the outside of the preform determines or contributes to determining the shaping of the preform. Typically a pressurised fluid is insufflated into a preform placed in a hollow mould. Typically the mould can be opened to enable the inlet of the preforms and the outlet of the containers. Appropriately, the first blowing station 31 is a stretch blowing station. It comprises a stretching rod, which is introduced through a mouth of the preform to facilitate the shaping thereof. Such stretching rod is used to elongate at least a part of the preform.

What is described with respect to the first blowing station 31 can advantageously also be repeated for the second and/or the third blowing station 32, 33 and possibly for the other blowing stations.

At least in one blowing operating configuration of the preforms, the first and the second blowing station 31, 32 maintain predefined locations. Such locations are therefore fixed in space. Therefore the position of the first and the second station 31, 32 does not change at least in said operating configuration. Appropriately also the third blowing station 33, at least in a blowing operating configuration of the preforms, maintains its location (this can also be repeated for any other blowing stations).

In the preferred solution, the position of the first and of the second blowing station 31, 32 is always fixed. Therefore, the blowing zones are predefined zones in space and do not move. This does not mean that the blowing stations are completely immovable. For example, they can open (two half-shells advantageously being mutually distanced) to enable for example the inlet of preforms and the outlet of containers or to enable the movement of any stretching rod. The first and the second blowing station 31, 32 (or more generally the blowing stations) are not therefore rotating masses. This facilitates the electrical and fluid connections. It also facilitates the structural sizing.

As exemplified in the solution of FIGS. 5-8, the first and the second blowing station 31, 32 (appropriately also the third and/or further blowing stations) are all located along a same side of the delivery line 21. For example, with reference to FIG. 7 the delivery line 21 comprises an arched section (preferably circumferential); the blowing stations are all and only on the external side of said arched section. In particular, they are arranged in a radially more external position.

Figure 2:
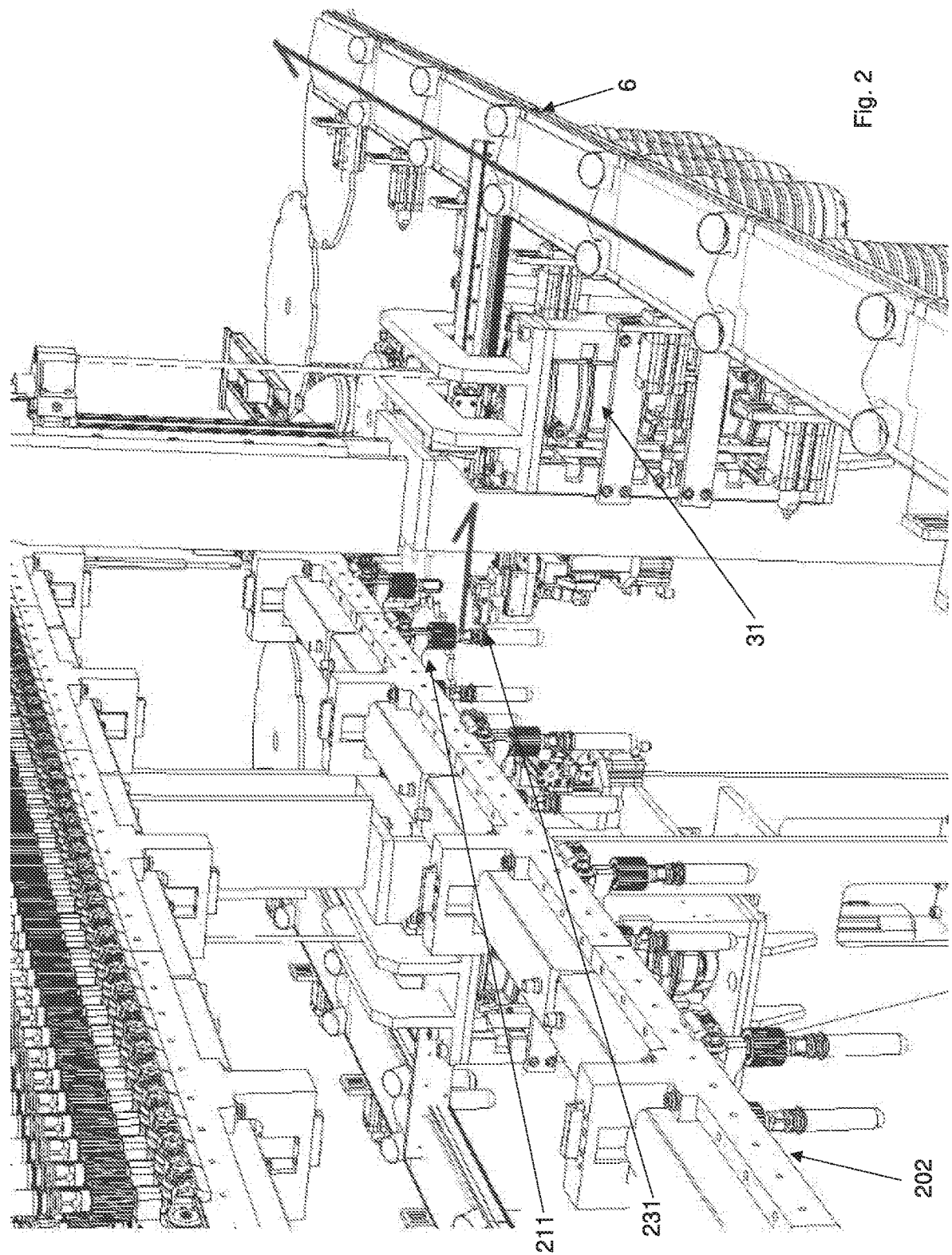
FIG. 2 shows a detail of the design solution of FIG. 1.
Figure 3:
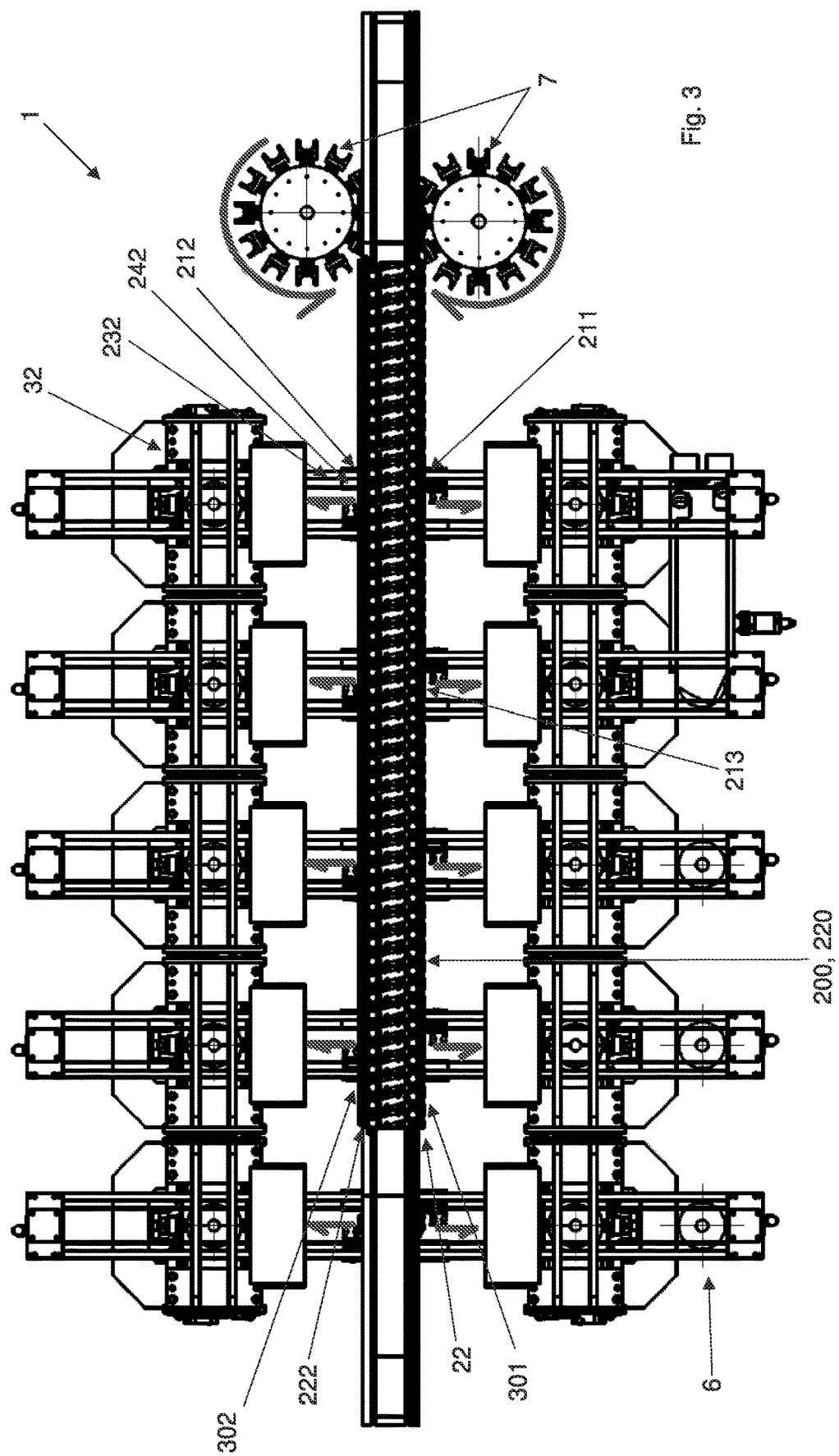
FIGS. 3 and 4 show, respectively, a plan view and a lateral view, of the first design solution.
Figure 3A:
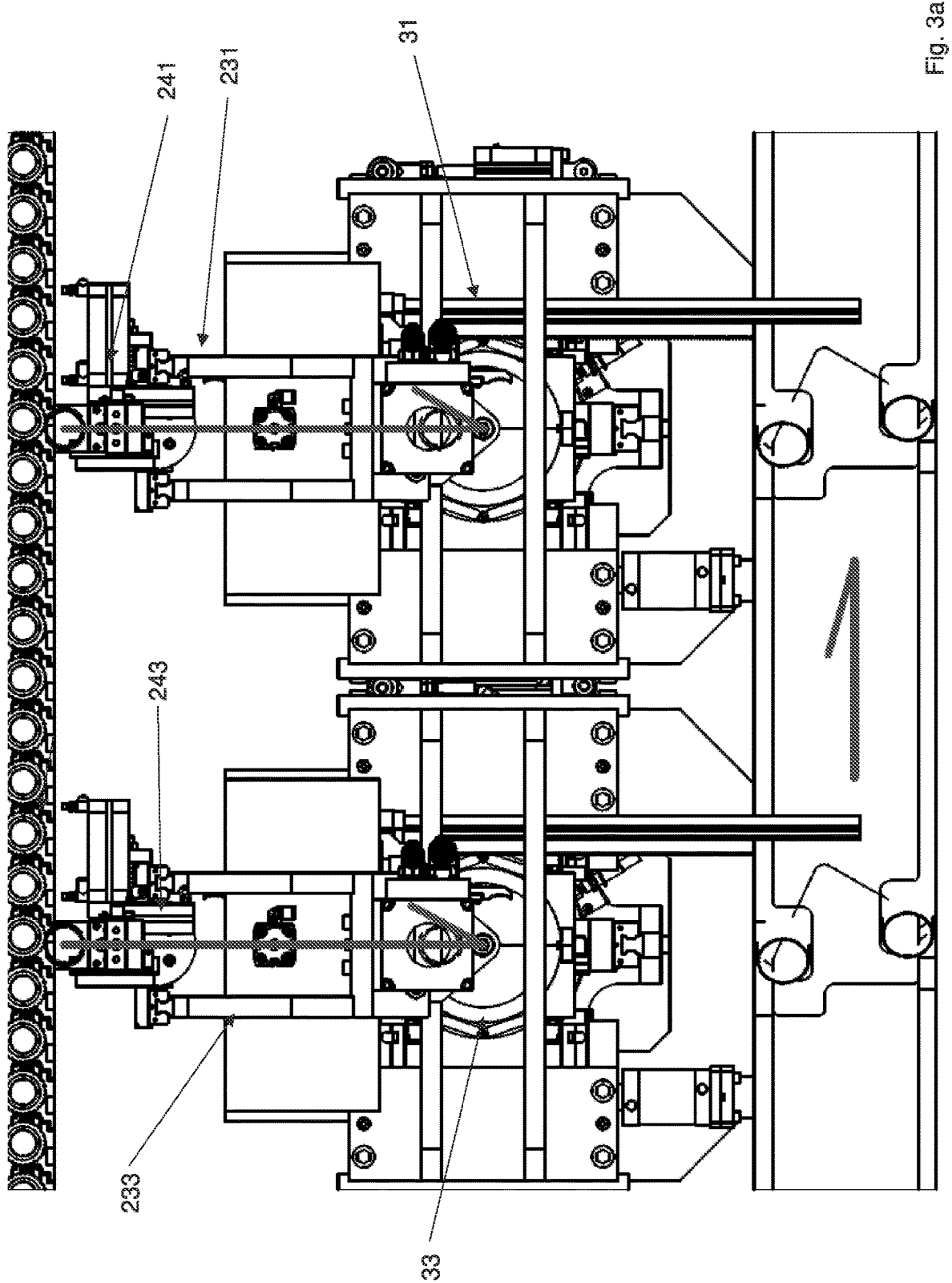
FIG. 3a shows an enlargement of a portion of FIG. 3.
Figure 4:
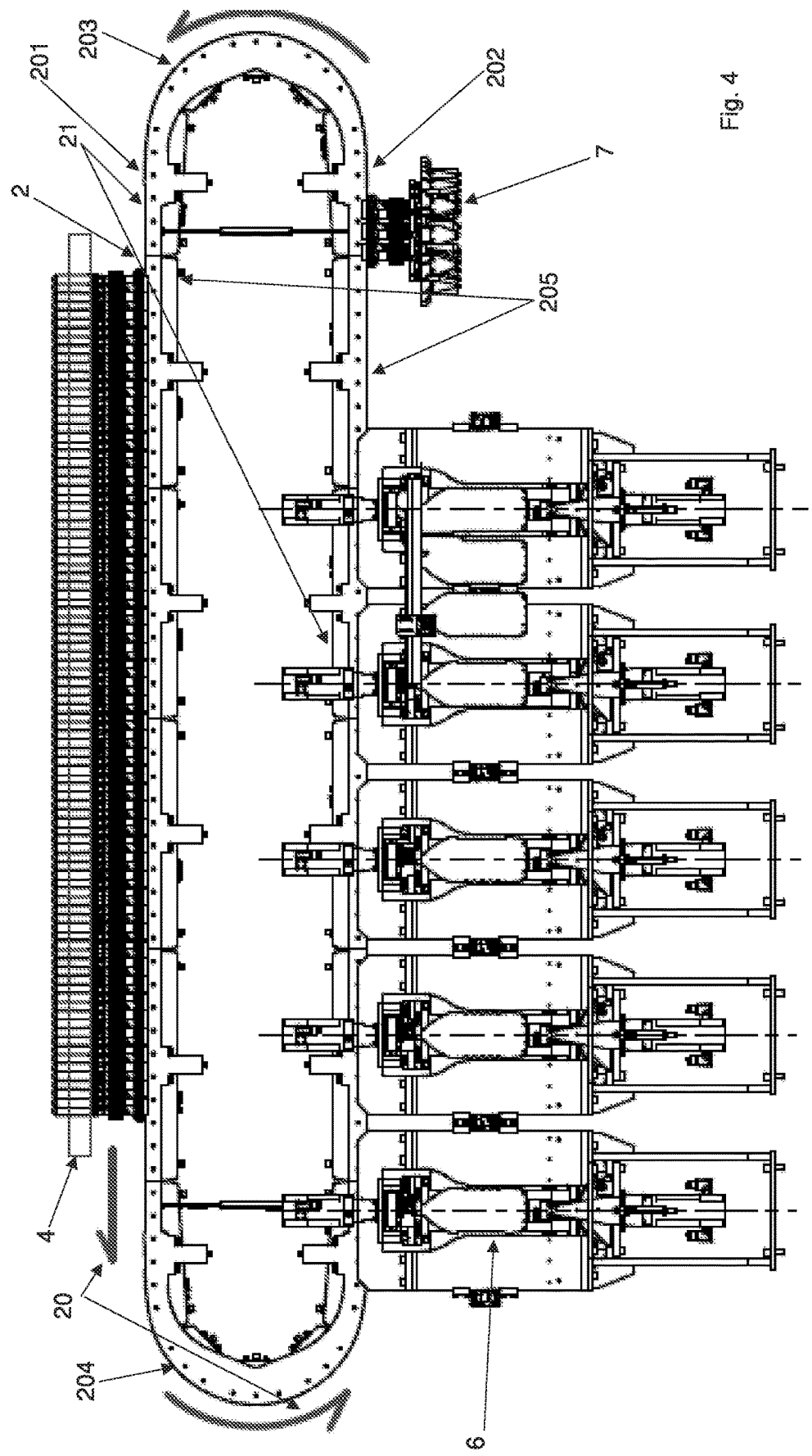

As exemplified in the solution of FIGS. 1-4, the first and the second blowing station 31, 32 (appropriately also the third and/or further blowing stations) are all located in part on a first side 301 and in part on an opposite side 302 of the delivery line 21 (or more precisely of the circuit 205 better defined as follows). Appropriately, there is an equal number of them on both sides. In particular, in that case, the blowing stations that are on the first side 301 extend along a first straight line. Likewise, the stations that are located on said opposite side 302 are located aligned along a second straight line. Preferably, there are at least three (there may also be at least five) blowing stations both on the first side 301 and on the opposite side 302 of the delivery line 21.

The movement system 2 comprises a delivery means 200 for delivering the preforms between the blowing stations. The delivery means 200 comprises a plurality of carriages 220. Such carriages 220 can comprise wheels, but alternatively they can comprise sliding blocks or sliding elements or may be contactless (e.g. by magnetic interaction with a support).

The delivery line 21 comprises a circuit 205 that defines a linear trajectory 20 closed onto itself for the carriages 220. Appropriately, the circuit 205 defines an annular path for the carriages 220. The preforms only perform a part of such linear trajectory 20 closed onto itself. The carriages 220 always remain constrained to said linear trajectory 20 closed onto itself; the carriages 220 cannot therefore exit from the circuit 205 (this is during normal operation; the carriages 220, if desired, can be removed from the circuit 205, e.g. in the event of maintenance). The delivery means 200 appropriately comprises a plurality of carriages 220 that move along the linear trajectory 20 closed onto itself. In particular, such plurality of carriages 220 comprises a first carriage 22 which moves along a linear trajectory closed onto itself; said first and said second outlet zone 211, 212 extend along said closed trajectory 20. The first and the second outlet zone 211, 212 can extend in succession (see for example FIGS. 7, 8). Alternatively, two outlet zones (e.g. the first and the second outlet zone 211, 212) can be flanked on opposite sides of the circuit 205 (see for example FIGS. 3, 4). The carriages 220 that move along the linear trajectory 20 are therefore carriages for the delivery of the preforms between the blowing stations present.

Appropriately, the delivery line 21 is a main line. Secondary lines then branch off from there, associated with corresponding blowing stations.

On that point, the movement system 2 comprises a first and a second branch 231, 232 which extend from said delivery line 21 (in particular they extend from the circuit 205) respectively starting from the first and from the second outlet zone 211, 212. Appropriately, from the main line (in particular from the circuit 205), a plurality of branches extend, each intended to supply corresponding blowing stations. Such branches are advantageously fixed in space. They extend transversally, preferably orthogonally, to the main line (or better to the circuit 205).

The movement system 2 appropriately comprises a first conveyor 241 of a preform. The first conveyor 241 is movable (typically translatable) along the first branch 231. The first conveyor 241 moves one of said preforms from said first outlet zone 211 (in which it typically receives the preform from the first carriage 22) to said first blowing station 31. Preferably in the first zone 211 the first carriage 21 stops to pass the preform to the first conveyor 241. The first conveyor 241 typically moves forwards and backwards along said first branch 231. This is to bring the preforms collected from the main line to the first blowing station 31 and perform a return stroke for collecting a further preform.

The movement system 2 appropriately comprises a second conveyor 242 of a preform. The second conveyor 242 is movable (typically translatable) along said second branch 232. The second conveyor 242 moves one of said preforms from said second outlet zone 212 to said second blowing station 32.

The first or the second conveyor 241, 242 (or more generally each conveyor) can comprise a support means for supporting a single preform. However, it could comprise a support means of a plurality of preforms. In fact, each blowing station could also be suitable for performing the simultaneous blowing of two or more preforms.

Appropriately, there is one conveyor for each of the branches that extend from the main line (or better from the circuit 205) for supplying corresponding blowing stations. What is described with reference to the first conveyor 241 can be repeated for the second conveyor 242 or for further conveyors placed along the branches extending from the main line (or better from the circuit 205).

In a non-preferred and non-illustrated solution, the blowing stations may be movable along the branches that extend from the main line, thus going towards the circuit 205 for collecting the preform. In a further non-illustrated solution, the blowing stations could be fixed along the circuit 205 and collect the preforms from the carriages 220 (without the need for movable intermediate conveyors along said branches transverse to the circuit 205, such as for example the conveyors 241 and 242).

The first carriage 22 previously described moves along the closed linear trajectory 20 and is distinct from the conveyors that move along the branches that branch off from the main line (e.g. the first and the second conveyor 241, 242).

Appropriately, the first carriage 22 comprises a gripping means, typically a gripper or a chuck with an internal grip or an external grip. For example, the gripper could comprise two jaws recalled towards one another by an elastic means. The insertion of a preform between the two jaws enables the jaws to be moved apart overcoming the elastic feedback of the elastic means. Preferably, the gripper is not electrically or pneumatically activated (even if in an alternative solution it could be).

Appropriately, also the first conveyor 241 comprises a gripping means, typically a gripper or a chuck with an internal grip or an external grip, e.g. of the type described for the first carriage 22.

In the solution shown in FIGS. 5-8 appropriately along the circuit 205 there is a plurality of carriages 220 each intended to move at least one preform (e.g. there could be one as illustrated in FIG. 7c, but there could also be two or more). Appropriately, there are as many carriages 220 as the blowing stations. Appropriately, there is a second carriage 222 intended to support at least one preform. The second carriage 222 is movable independently with respect to the first carriage 22. Appropriately, the second carriage 222 is independent from the first carriage 22 not only in terms of position but also in terms of speed and acceleration.

Appropriately, the movement system 2 comprises a linear motor (typically magnetic) which extends along the circuit 205 (this could affect both the solution of FIGS. 1-4 and the solution of FIGS. 5-8). Such linear motor comprises a means for the generation of a magnetic field placed along the circuit 205 (the magnetic field is appropriately variable as a function of the time and the position along the path 205). The first carriage 22 comprises a magnetic means that interacts with the linear magnetic motor causing the movement thereof. Likewise, the second carriage 222 (and appropriately each of the carriages 220) comprises a magnetic means that interacts with the linear motor determining the movement thereof. The carriages 220 could however also be activated in another way, e.g. each one with its own motor that activates a wheel or a pinion meshing with a rack.

Appropriately, the first carriage 22 is suitable for passing the preform to the first conveyor 241 at said first outlet zone 211 (appropriately the first carriage 22—exemplified in FIG. 3b—could also carry a plurality of preforms to pass simultaneously to the first conveyor 241). The first conveyor 241 will convey the preform to the first blowing station 31. Appropriately, the trajectory of the first conveyor 241 will be spoke-shaped, e.g. radial, with respect to said circuit 205.

Likewise, the second carriage 222 (or the first carriage 22 in the case in which it conveys at least two preforms on two opposite sides of the circuit 205) is suitable for passing the preform to the second conveyor 242 at the second outlet zone 212. The second conveyor 242 will convey the preform to the second blowing station 32. This is repeatable for the remaining conveyor carriages 220.

Appropriately, in the solution of FIGS. 5-8, the delivery line 21 can comprise a plurality of wheels 5 arranged in succession which receive and transfer the preforms. Such plurality of wheels 5 is upstream of said linear trajectory 20 closed onto itself and appropriately downstream of the heating means 4. Said plurality of wheels appropriately comprises:
- a first wheel 51 that collects the preforms downstream of the heating means 4;
- a second wheel 52 comprising a means for regulating the pitch between the preforms; appropriately, the second wheel 52 comprises a series of ball recirculation sliding blocks moved by a mechanical cam that defines the preform pitch thereof; (possibly the first wheel 51 could even be absent with suitable pitch variations for the second wheel 52);
- a third wheel 53 that transfers the preforms to the first carriage 22 and to the other carriages 220 present along the circuit 205. Appropriately, the third wheel 53 has a fixed pitch. Appropriately, the second wheel 52 receives the preforms from the first wheel 51 (if present) and passes it to the third wheel 53.

The three wheels 51, 52, 53 are synchronised by means of a belt transmission with its own brushless motorisation (in the event in which the first wheel 51 is absent the belt transmission could affect the second and the third wheel 52, 53).

In the solution shown in FIGS. 1-4, the trajectory 20 comprises an upper section 201 and a lower section 202. The upper section 201 and the lower section 202 are connected by means of a first and a second connecting zone 203, 204. The first and second connecting zones 203, 204 are curvilinear. Appropriately, they define an arched path (e.g. a semi-circle). The upper section 201 and the lower section 202 are appropriately rectilinear. As exemplified in FIG. 4, the trajectory is therefore ellipsoidal. Passing from the upper section 201 to the lower section 202 the preforms are overturned. In actual fact, also the first carriage 22 and the other carriages 220 for moving the preforms are overturned.

The lower section 202 is placed below the upper section 201. The heating means 4 is located at the upper section 201. In particular, it is confined in proximity to the upper section 201. It is not located at the lower section 202. The first and the second outlet zones 211, 212 are located at the lower section 202. The third outlet zone 213 is also located at the lower section 202. Along the lower section 202 the movement means 2 also comprises a system 7 for loading the preforms onto the circuit 205. It enables the preforms to be loaded, which are then conveyed to the blowing stations. Such loading system 7 can comprise one or more rotating loading carousels. The linear trajectory directs the preforms loaded by said loading system 7 towards the upper section 201 and then again onto the lower section 202 towards the blowing stations.

Appropriately, the system 1 also comprises a line 6 for ejecting the formed containers from the blowing stations. Appropriately a single ejection line 6 receives the containers from a plurality of blowing stations and conveys them towards a collection point.

Appropriately, between the blowing stations and the ejection line 6 the system 1 is possibly able to store the containers produced from the preforms. In particular, it enables the containers produced by the preforms already loaded into the machine to be temporarily stored in case of emergency or stops of the downstream automations. Upon restarting, the containers are automatically put back into the line. Appropriately, along at least one downstream section of the blowing stations, the system 1 can comprise a system of guides that support the containers and/or a system of belts or air manifolds to transport the containers conveying them into a single outlet.

The subject matter of the present invention is also a method for producing plastic containers from preforms (the preforms are indicated by way of example with reference P in FIGS. 3b and 7c).

Such a method is advantageously implemented by a production device 1 having one or more of the features described previously.

The method conveniently comprises the steps of:
- moving the preforms along the delivery line 21 for delivering the preforms towards a plurality of blowing stations (comprising at least the first and the second blowing station 31, 32 described below);
- blowing at least a first one of said preforms in the first blowing station 31;
- blowing at least a second one of said preforms in the second blowing station 32.

Appropriately, the method comprises the step of heating the first and the second preform. This takes place before performing the blowing of the first and the second preform. Appropriately, the step of heating the first and the second preform takes place when the first and the second preform are along the delivery line 21 of the preforms. Possibly, the step of heating the first and the second preform can take place at least in part simultaneously to the step of moving the preforms along the delivery line 21 (additionally or alternatively it could take place during one or more breaks in the advancement of the preforms along the delivery line 21). The step of heating the preforms envisages making the preforms transit at the heating means preferably operating by radiation. The preforms can be arranged on two parallel rows along at least one section of the delivery line 21. On this point, the step of heating the first and the second preform could take place by means of a heating means 4 placed between the two parallel rows of preforms. In this way, the uniformity of the preform heating process would be optimised (important for the quality and uniformity of the finished product).

The method then comprises the step of sorting the preforms placed along the delivery line 21 directing them towards a plurality of blowing stations (advantageously at least three, preferably at least six). Appropriately, the step of sorting the preforms along the delivery line 21 comprises (as also explained above and below) the step of conveying the preforms on a plurality of carriages 220 that move along a linear trajectory 20 closed onto itself (such trajectory defines a circuit 205); appropriately such carriages 220 move independently from one another (appropriately in terms of position, speed and acceleration); the carriages 220 release a preform at an outlet zone from said circuit 205 so that it is transferred to a corresponding blowing station. The carriages 220 conveniently comprise a first and a second carriage 22, 220. Appropriately the first and the second carriage 22, 220 move along the linear trajectory 20 closed onto itself. The delivery line 21 comprises/is therefore a main line from which the branches extend, intended for the various blowing stations.

On this point, the method comprises the step of making the first of said preforms exit from said delivery line 21. This takes place at a first outlet zone 211. The first preform is therefore directed towards the first blowing station 31.

The method further comprises the step of making the second of said preforms exit from said delivery line 21. This takes place at a second outlet zone 212 distinct from the first zone 211 and envisages directing the second preform to the second blowing station 32.

Appropriately, the method described above for a first and a second preform can be repeated for a plurality of other preforms.

In particular, the method further comprises the step of making the third of said preforms exit from said delivery line 21. This takes place at a third outlet zone 213 distinct from the first and the second zone 211 and envisages directing the third preform to the third blowing station 33.

The method then comprises the step of blowing at least a third one of said preforms in the third blowing station 33.

Appropriately, the method envisages conveying by means of a first conveyor 241 the first preform from the first outlet zone 211 to the first blowing station 31. Such conveying step preferably takes place by moving (preferably translating) the first conveyor 241 along a first branch 231. Such first branch 231 extends transversally (preferably orthogonally) with respect to a section of the delivery line 21 from which such first branch 231 extends. After having conveyed the first preform to the first blowing station 31 the first conveyor 241 returns to the first outlet zone to collect a further preform.

The above description for the first conveyor 241 can be repeated for a second conveyor 242 (which moves the second preform from the second outlet zone 212 to the second blowing station 32 by means of a second branch 232) and appropriately for a third conveyor 243 (which moves the third preform from the third outlet zone 213 to the third blowing station 33 by means of a third branch 233).

Appropriately during the step of blowing the first preform the first blowing station 31 stops in a first location.

Likewise, during the step of blowing the second preform the second blowing station 32 stops in a second location.

Equally, during the step of blowing the third preform the third blowing station 33 stops in a third location. This can be repeated for all the blowing stations of the system 1.

Appropriately the method envisages positioning the preforms that enter the various blowing stations temporally staggered from one another. This is in order to minimise the downtime and ensure that the blowing process starts for all the preforms substantially after the same time interval from the start of the heating phase.

Therefore, the blowing stations release the containers now formed according to a predefined succession that is cyclically repeated in an unvaried way (except in the event of malfunctioning). As one blowing station is freed, the method envisages positioning there a new preform to be blown. Therefore, if there is a number "n" of operating blowing stations the "n" stations shall form corresponding containers in sequence.

Appropriately, in the event of malfunctioning of a station the positioning of the preforms in such station is prevented. One of the carriages 220 intended to transport a preform for such blowing station shall stop along the circuit 205 so as to convey the preform to a different blowing station.

For example, in the event of malfunctioning of the first station 31 the positioning of the preforms in said first station 31 is prevented and the preform will be positioned in another blowing station.

Appropriately, the method envisages that the first blowing station 31 receives the preform to be blown at the inlet on a first side and unloads the container at the outlet on an opposite side; what is described with reference to the first blowing station 31 can however be repeated also for one or more or all of the remaining blowing stations (in an alternative solution not illustrated the method can envisage the first blowing station receiving the preform at the inlet from the same step that also enables the outlet of the container).

Appropriately, the method comprises the step of positioning the containers supplied by a plurality of blowing stations along a same ejection line 6. Preferably one or two ejection lines of the formed containers are present. All the blowing stations appropriately unload the containers on said one or two ejection lines. The containers can therefore be conveyed into a common collection centre. With specific reference to the solution of FIGS. 5-8 the step of moving the preforms along a delivery line 21 comprises the steps of:

advantageously conveying the preforms along a linear section 8 in which the preforms are heated;
conveying the preforms on a plurality of carriages 220 that move along a linear trajectory 20 closed onto itself (such trajectory defines a circuit 205); appropriately such carriages 220 move independently from one another; the carriages 220 release a preform at an outlet zone from said circuit 205 so that it is transferred to a corresponding blowing station;
advantageously transferring the preforms from the linear section 8 in which they are heated to the carriages 220 that move along the circuit 205; this appropriately takes place through one or more loading carousels 5.

The blowing stations are external to such circuit 205.

The preforms unloaded from the carriages 220 are conveyed to the blowing stations by means of appropriate conveyors (e.g. see the conveyors 241, 242) which appropriately move (preferably translate) in a spoke-like fashion with respect to said closed linear trajectory 20. Preferably they move radially with respect to such circuit 205.

With specific reference to the solution of FIGS. 1-4, the step of moving the preforms along the preform delivery line 21 comprises the step of loading, preferably by means of a rotating carousel, the preforms along an annular conveyor which enables the movement of the carriages 220 along said linear trajectory 20 closed onto itself.

Advantageously, the preforms are loaded along two flanked and parallel rows. In that case there are two carousels that load the preforms onto corresponding rows.

Appropriately, the step of heating the preforms takes place when the preforms are located in an upper section 201 of the linear trajectory 20.

Appropriately, such linear trajectory 20 extends along a vertical plane or however extends from the top downwards.

Appropriately, the step of making the preforms exit from the delivery line 21 takes place in a lower section 202 of said linear trajectory 20 closed onto itself. For example, the following mentioned steps take place along said lower section 202:

letting the first of said preforms leave said delivery line 21 at a first outlet zone 211 directing it towards the first blowing station 31; and letting the second of said preforms leave said delivery line 21 at a second outlet zone 212 distinct from the first zone 211 and directing it towards the second blowing station 32.

The present invention achieves important advantages. First of all, the preforms are directed/delivered to the various blowing stations. Then the preforms that have a negligible weight are moved and the blowing stations are not in rotation. Therefore, the moving masses are reduced, in particular the rotating masses. This facilitates the sizing of the machine and reduces the wear thereof. Furthermore, it is not necessary to adopt sophisticated solutions for the delivery or air or another fluid (for blowing) and/or water or another fluid (for cooling) to the blowing stations. In fact, fixed lines can be used for supplying such fluids. This is to the advantage of the reduction of the implementation and maintenance costs.

A further important advantage with respect to rotary blowers is that the blowing cycle can be optimised at the different hourly productions. Furthermore, there is a preform delivery system which is flexible and therefore there is no waste in the event of breakdowns or exclusion of a mould unit.

The invention as it is conceived is susceptible to numerous modifications and variants, all falling within the scope of the inventive concept characterised thereby. Furthermore, all the details can be replaced with other technically equivalent elements. In practice, all the materials used, as well as the dimensions, can be any whatsoever, according to need.

The invention claimed is:

1. A system for producing plastic containers from preforms, comprising:
    a plurality of blowing stations comprising at least a first and a second blowing station (31, 32) for blowing the preforms;
    a movement system (2) for moving the preforms comprising a delivery line (21) for delivering the preforms towards said blowing stations;
    a heating means (4) for heating the preforms located along the delivery line (21);
    wherein the delivery line (21) comprises a first and a second outlet zone (211, 212) for the outlet of the preforms from said delivery line (21); the first and the second preform outlet zone (211, 212) being in mutually distinct positions and being intended to supply respectively the first blowing station (31) and the second blowing station (32); the preforms entering the first and the second blowing station (31, 32) are temporally staggered from one another;
    the movement system (2) comprising a delivery means (200) for delivering the preforms between the blowing stations, said delivery means (200) in turn comprising a plurality of carriages (220) for moving the preforms, said plurality of carriages (220) configured to move independently from one another;
    the delivery line (21) comprising a circuit (205) that defines a linear trajectory (20) that is closed onto itself for said plurality of carriages (220); said heating means (4) and said first and said second outlet zone (211, 212) being located along said closed trajectory (20), said first and said second outlet zone (211, 212) allowing the outlet of the preforms from said circuit (205);
    the movement system (2) comprising a magnetic linear motor which extends along the circuit (205).

2. The system according to claim 1, characterised in that, at least in a blowing operating configuration of the preforms, the first and the second blowing stations (31, 32) are located respectively in locations that are fixed in space.

3. The system according to claim 1, characterised in that said plurality of blowing stations comprises a third blowing station (33) for blowing the preforms supplied by said movement system (2); the delivery line (21) comprising a third outlet zone (213) distinct from said first and second outlet zone (211, 212) for supplying said third blowing station (33).

4. The system according to claim 1, wherein said trajectory (20) comprising an upper section (201) and a lower section (202); said lower section (202) being placed below the upper section (201); said heating means (4) being located at the upper section (201); the first and the second outlet zones (211, 212) being located at the lower section (202).

5. The system according to claim 1, characterised in that said movement system (2) for moving the preforms comprises:
    a first and a second branch (231, 232) that extend from the annular path (205) respectively starting from the first and the second outlet zone (211, 212);
    a first conveyor (241) of a preform; said first conveyor (241) being movable along said first branch (231) and moving one of said preforms from said first outlet zone (211) to said first blowing station (31);
    a second conveyor (242) of a preform; said second conveyor (242) being movable along said second branch (232) and moving one of said preforms from said second outlet zone (212) to said second blowing station (32).

6. The system according to claim 1, characterised in that said plurality of carriages (220) comprises:
    a first carriage (22) which moves along a linear trajectory closed onto itself;
    a second carriage (222) intended to support at least one preform; the second carriage (222) being movable independently with respect to the first carriage (22); the magnetic linear motor comprises a means for the generation of a magnetic field placed along the circuit (205); the first carriage (22) comprises a magnetic means that interacts with the linear magnetic motor causing the movement thereof; the second carriage (222) comprising a magnetic means that interacts with the linear motor determining the movement thereof.

7. The system according to claim 1, characterised in that the first and the second blowing station (31, 32) are located in part on a first side (301) and in part on an opposite side (302) of the circuit (205).

8. The system according to claim 6, characterised in that the second carriage (222) is independent from the first carriage (22) not only in terms of position but also in terms of speed and acceleration.

9. The system according to claim 6, characterised in that the magnetic field is variable as a function of the time and the position along the path (205).

\* \* \* \* \*